United States Patent [19]

Levitan et al.

[11] Patent Number: 5,214,890
[45] Date of Patent: Jun. 1, 1993

[54] OFFICE PANEL WITH LAY-IN COMMUNICATION CABLE CAPABILITY

[75] Inventors: Stephen L. Levitan; John Hellwig, both of Toronto; Alexandre B. F. Coelho, Oakville, all of Canada

[73] Assignee: Teknion Furniture Systems, Downview, Canada

[21] Appl. No.: 692,387

[22] Filed: Apr. 29, 1991

[51] Int. Cl.⁵ .............................. E04B 2/42
[52] U.S. Cl. ...................... 52/220.7; 52/239
[58] Field of Search ............ 52/220, 221, 239; 174/48, 49, 97, 101

[56] References Cited

U.S. PATENT DOCUMENTS

| | | | |
|---|---|---|---|
| 3,593,468 | 7/1971 | Bustin | 52/221 |
| 3,683,100 | 8/1972 | Deal et al. | 52/220 |
| 4,391,426 | 6/1983 | Göthberg | 174/101 |
| 4,559,410 | 12/1985 | Hostetter | 174/48 |
| 4,593,499 | 6/1986 | Kobayashi et al. | 52/220 |
| 4,631,881 | 12/1986 | Charman | 52/220 |
| 4,642,418 | 2/1987 | Meuchetti | 174/48 |
| 4,744,010 | 5/1988 | Witte | 174/97 |
| 4,773,196 | 9/1988 | Yoshida et al. | 52/220 |
| 4,800,696 | 1/1989 | Miller et al. | 52/221 |
| 4,841,699 | 6/1989 | Wilson et al. | 52/221 |
| 4,874,322 | 10/1989 | Dola et al. | 52/239 |
| 4,876,835 | 10/1989 | Kelley et al. | 52/239 |
| 4,881,352 | 11/1989 | Glockenstein | 52/239 |
| 4,905,428 | 3/1990 | Sykes | 52/239 |

Primary Examiner—Carl D. Friedman
Assistant Examiner—Christopher Kent

[57] ABSTRACT

An office panelling system is disclosed which readily accommodates the initial or retrofit of communication cables and the like cables which generally do not require an electrical conduit. The individual panels of the system have a metal framework to which decorative covers are secured. The framework and covers have been adapted to define a passageway along the panel which is accessible by removing of the covers. With this arrangement, communication cables may be installed without stringing of the cables through ports in the framework.

5 Claims, 7 Drawing Sheets

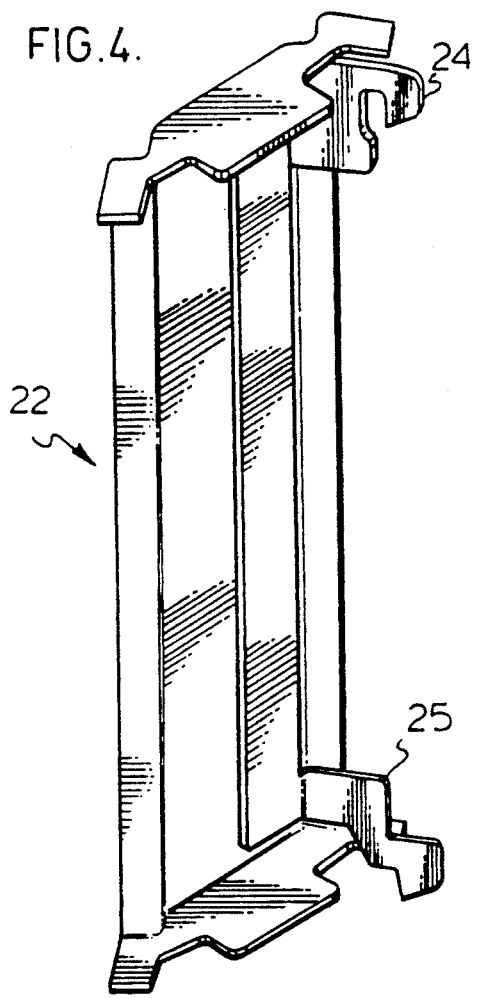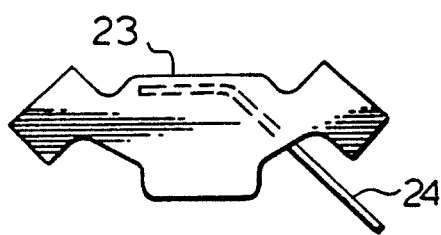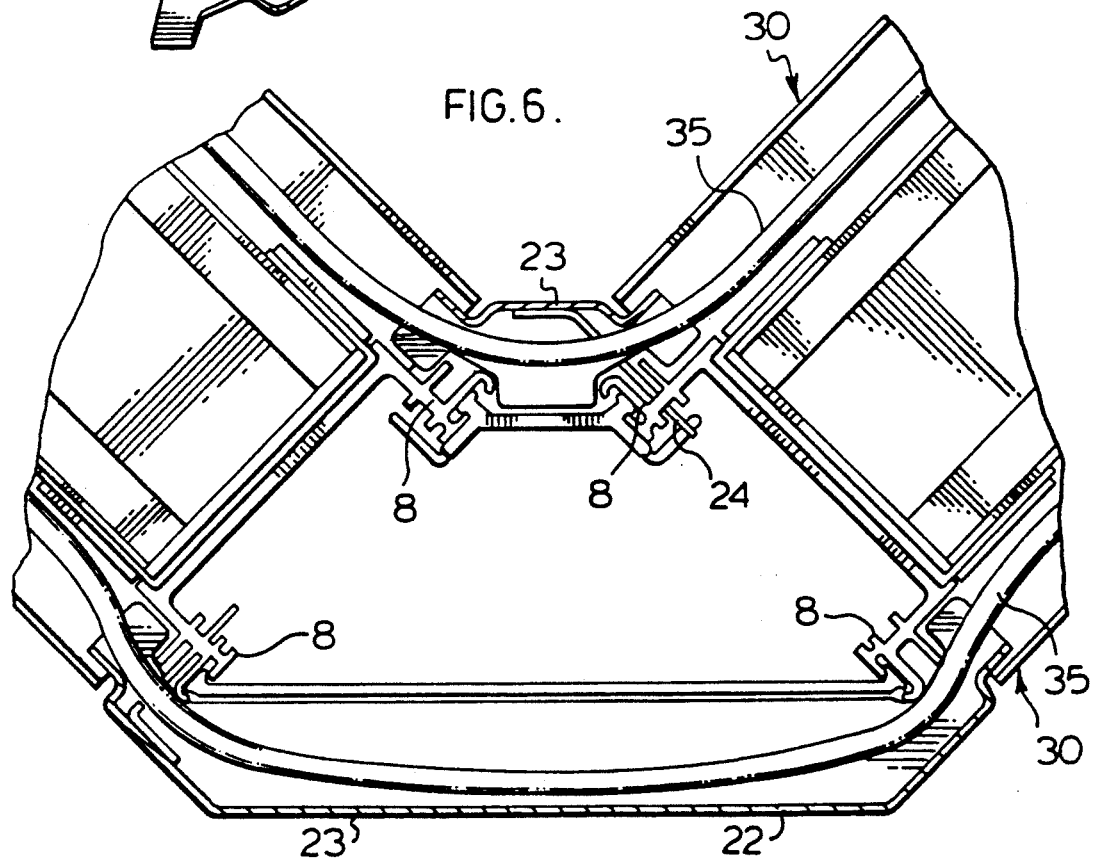

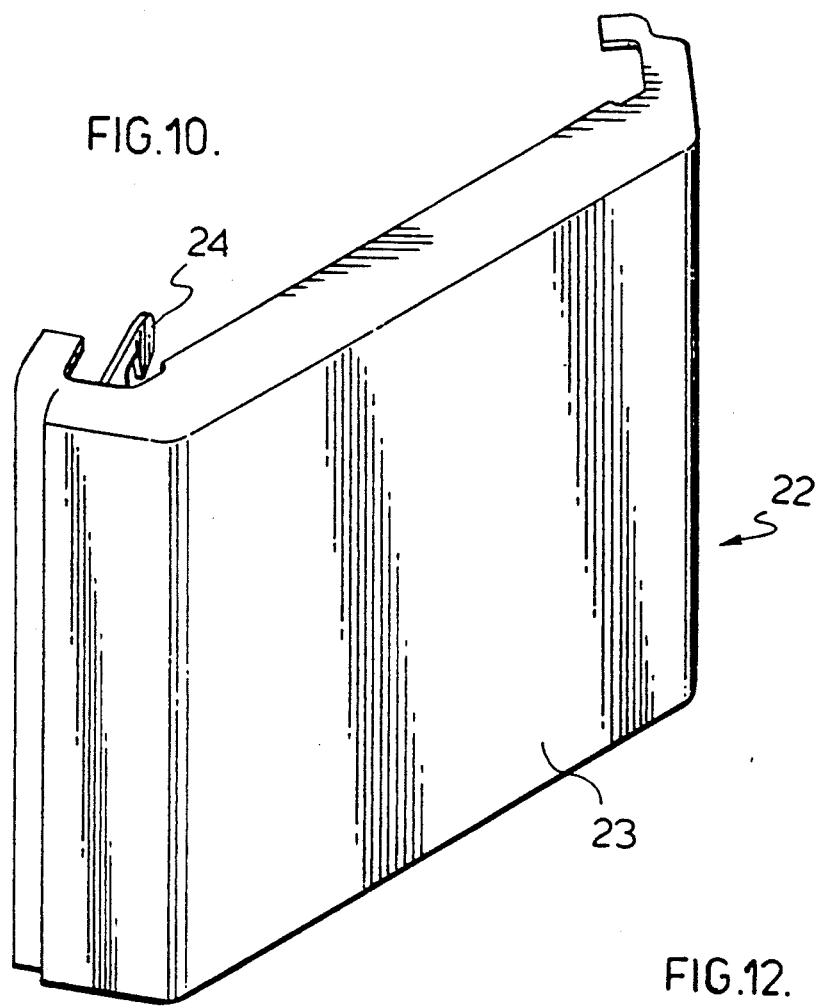
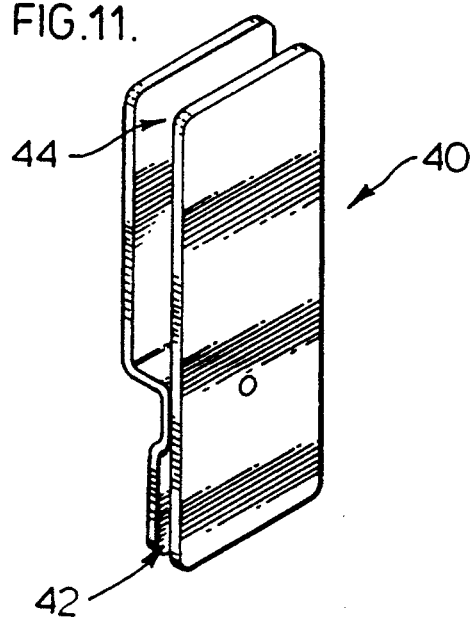
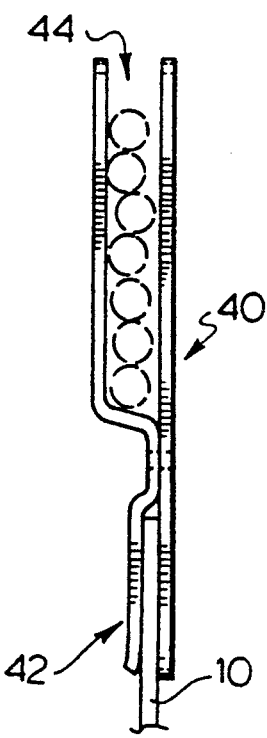

OFFICE PANEL WITH LAY-IN COMMUNICATION CABLE CAPABILITY

FIELD OF THE INVENTION

The present invention relates to office panelling systems and in particular to office panelling systems adapted to accommodate in a simple manner, the enclosure of fiber optic cables, communication cables and the like.

BACKGROUND OF THE INVENTION

There exists in the marketplace many office panelling systems which are designed to allow convenient and movable office panels by means of which an interior office may be laid out. The most popular systems today utilize a metal frame to which removable cover members are secured. Such a system is shown in our U.S. Pat. No. 4,535,577. This structure is designed to allow the feeding of electrical wires and electrical communication lines through the panels while also providing power generally at desk height. These systems are particularly practical when a system is initially installed, however the rewiring of the panels when a change in the layout and/or the addition of cables occurs, causes some difficulties, as the cables are fed through each individual panel. It should also be recognized that not all cables require an electrical conduit and particularly fiber optic cables do not require such protection and other communication cables similarly do not require an enclosed electrical conduit.

In office layouts further communication conduit and/or optical cables are often required and there remains a need to provide a simple manner of allowing the retrofit of such cables within the office panelling system.

SUMMARY OF THE INVENTION

The present invention is directed to an office panelling system having a number of interconnected panels with each panel having movable cover members extending across the panel to provide access to a frame portion therebehind. A conduit is defined between the panels and the frame portion with this conduit extending across the panels. The conduit is accessible to receive cables and the like across the face of said frame portions by removing the covers and placing the cables within the conduit defined between the covers and the frame. When the covers are again placed on the frame, the cables are located within the conduit defined between the covers and the frame. This conduit is accessible by removing of the cover and replacement of the cover generally encloses the communication cable or fiber optic cable. Such a conduit need not meet the required standard for electrical conduits if only fiber optic or low voltage communication cables are to be inserted.

The present system allows for the convenient retrofitting of the office panelling system to accommodate fiber optic cables, communication cables and the like cables which can be received therein without stringing of the cables through ports in the frames. Such an arrangement considerably reduces the cost associated with the installation of such cables and renders the system more accommodating to the end user.

BRIEF DESCRIPTION OF THE DRAWINGS

Preferred embodiments of the invention are shown in the drawings, wherein:

FIG. 4 is a perspective view of the junction member;
FIG. 5 is a top view of the junction member of FIG. 4;
FIG. 6 is a top view showing the lay-in conduit at a corner junction between panels;
FIG. 10 is a perspective view of a junction member for joining panels at an angle;
FIG. 11 is a perspective view of a clip used to receive cables;
FIG. 12 is an end view showing the clip mounted on a panel retaining a number of cables.

DETAILED DESCRIPTION OF THE PREFERRED EMBODIMENTS

The general concept of the office panelling system is disclosed in our U.S. Pat. No. 4,535,577, which is incorporated herein by reference. In this system, various panels are secured in side by side relationship to define a dividing or partitioning wall.

Figure 1:
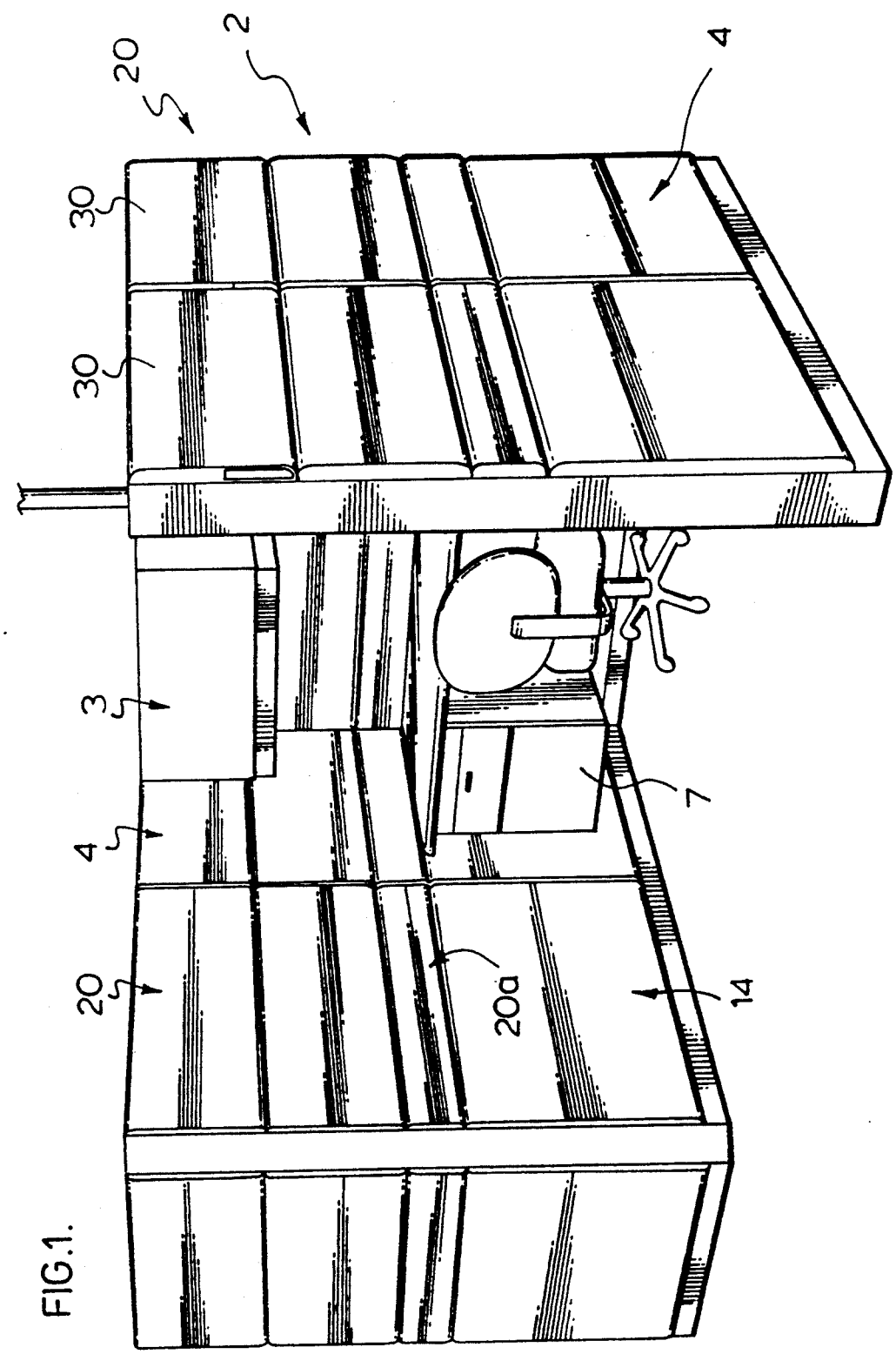
FIG. 1 is a perspective view of the panelling system.
Figure 2:
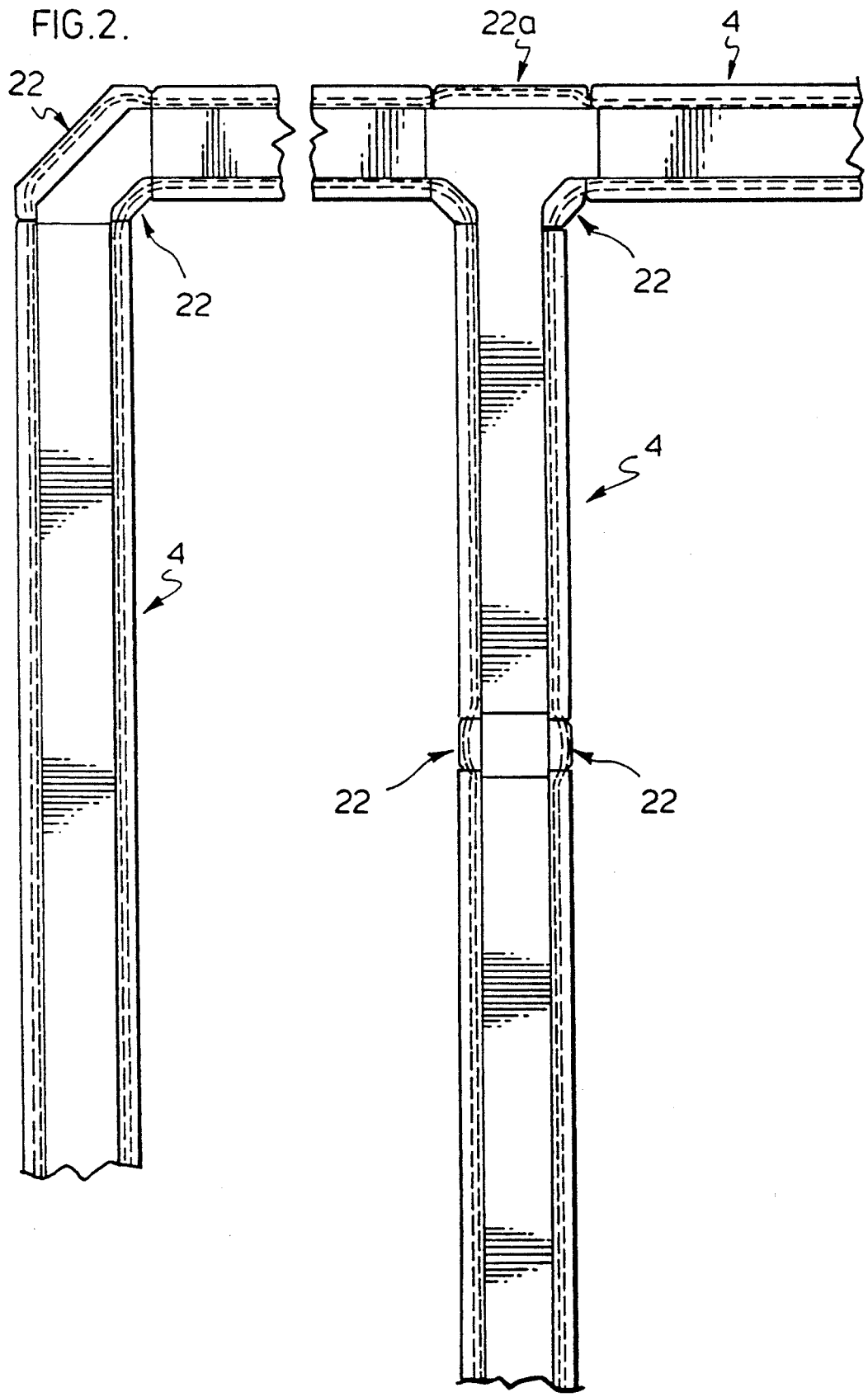
FIG. 2 is a top view of the panelling system.

The office panelling system, generally shown as 2 in FIG. 1, is made up of a number of individual office panels 4 that are interconnected to adjacent panels. The user predetermines the particular layout that he desires and then arranges the panels in the appropriate manner. Various accessories can be directly secured to the panels, such as the overhead bin shown as 3 and the desk unit shown as 7. It can be appreciated from FIG. 1 that there are a number of horizontal segments of panels defined by the individual rectangular cover members or elements. In this case, the top horizontal band, generally shown as 20, has customized covers 30, which are recessed on the interior surface at least at the vertical edges to allow cables to pass between the covers and a frame interior to the covers. The passage of these cables is illustrated in FIG. 2 with specialized junction members shown as 22 used to allow the cable to bridge the gap between adjacent panels.

Figure 3:
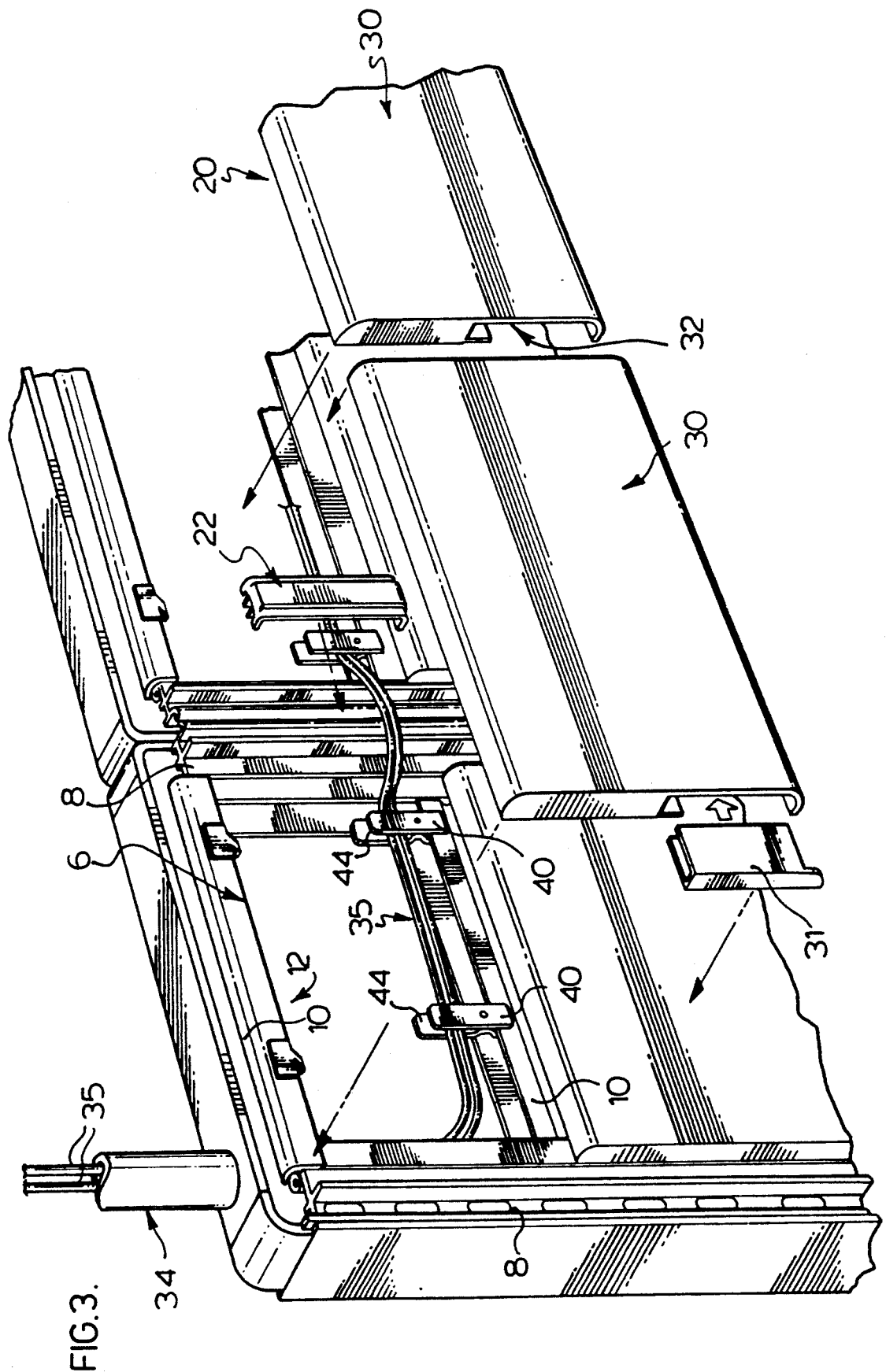
FIG. 3 is a partial perspective view showing a number of panels removed.

The interior frame of each of the panels is best shown in FIG. 3. In this case, it can be seen that the frame 6 of the panels is defined by opposed vertical members 8 joined by horizontal members 10. These members collectively define a generally rectangular framework which is closed top and bottom with a number of reinforcing members extending across the width of the panel. There are a number of open rectangular cells 12 interior to the panel which will define a hollow cavity when the covers are placed on the panel. These cells can be used for receiving equipment such as line drivers or merely accommodating excess loops of cables, if desired. As shown in FIG. 3, each of the customized covers 30 include a slotted region 32 which preferably runs the length of the cover and defines a cavity for accommodating the cables 35. Cables 35 can be any cables, but most often are communication cables, fiber optic cables, or other cables which do not necessarily require an electrical conduit. These cables can be introduced through the cable inlet 34.

As discussed in the background of the invention, it is often necessary, after a system has been installed, to add additional services which require the stringing of cable to various positions within the office panelling system. In the past, this has been accomplished by passing the cable through various ports in the framework, which is a tedious job, and it would be preferable to merely lay the cables across the framework. This is accomplished in the present system by having the slotted regions 32 in the customized panels 30 which allow the cables to pass across the panel. The transition across the junction of adjacent vertical members of adjacent panels as accomplished by junction members 22 which are secured to the individual panels in a manner to stand off a certain distance from the panels and provide a cavity therebehind through which the cables can pass. In practice, the customized covers 30 are removed from the panels and the cables are laid across the face of the frame of the panel with the cables placed in the cable retaining clips shown as 40. These clips 40 retain the cables interior to rectangular cells 12. The clips each have a panel engaging portion 42 which straddles a horizontal edge of a horizontal member 10, with each clip having an open "U" shaped slot 44 for receiving of the cables.

As shown in FIG. 4, each of the junction members 22 include a top securing hook 24 and a bottom securing hook 25. In this case, the junction member 22 of FIG. 4 is shown for a 90° interior connection, as shown in FIG. 6. Therefore, the top hook 24 and the bottom hook 25 are angled at a 45° angle and are secured to only one of the vertical upright members 8. The outer face 23 of the junction member 22 stands off the vertical members 8 of adjacent panels and provides a passageway therebehind through which the cables 35 can pass. It can be appreciated that there is a specialized outer junction member 22 for the exterior edge of the panels and, again, this member engages merely one of the vertical members 8 located at the exterior of the panels. This junction member also stands off the panels and allows for passage of the cables 35 to the exterior of the vertical members 8 while protected by the outer face of the junction member.

The junction members 22 have been described as separate and distinct components, however in some applications these junction members may be integral with a customized cover 30 or flexibly secured to such customized covers. Such attaching of the junction members and the customized covers reduces the number of components requiring assembly in the field.

To install cables, the relevant covers are removed, retain clips are installed, cables positioned on the framework of the panel, junction members then installed followed by the replacement of the panels, assuming the removal covers have the notched regions. The covers are last to be secured and partially cover the junction members such that the junction members cannot be removed without first removing the covers. With this arrangement, inadvertent removal of the junction members is avoided and the cables remain protected at the transition between adjacent panels.

Figure 7:
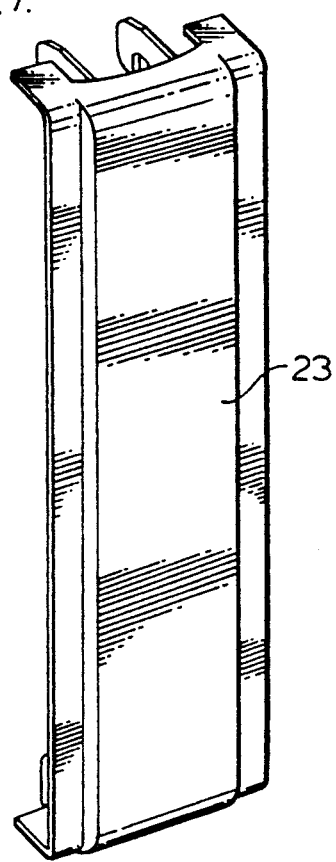
FIGS. 7, 8 and 9 are various perspective views of junction members.
Figure 8:
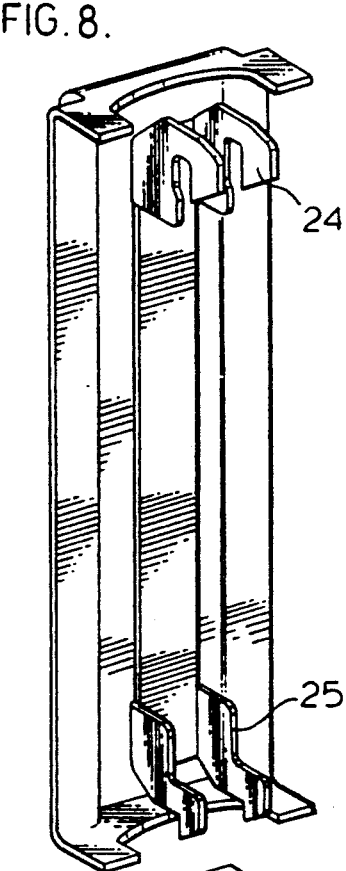
Figure 9:
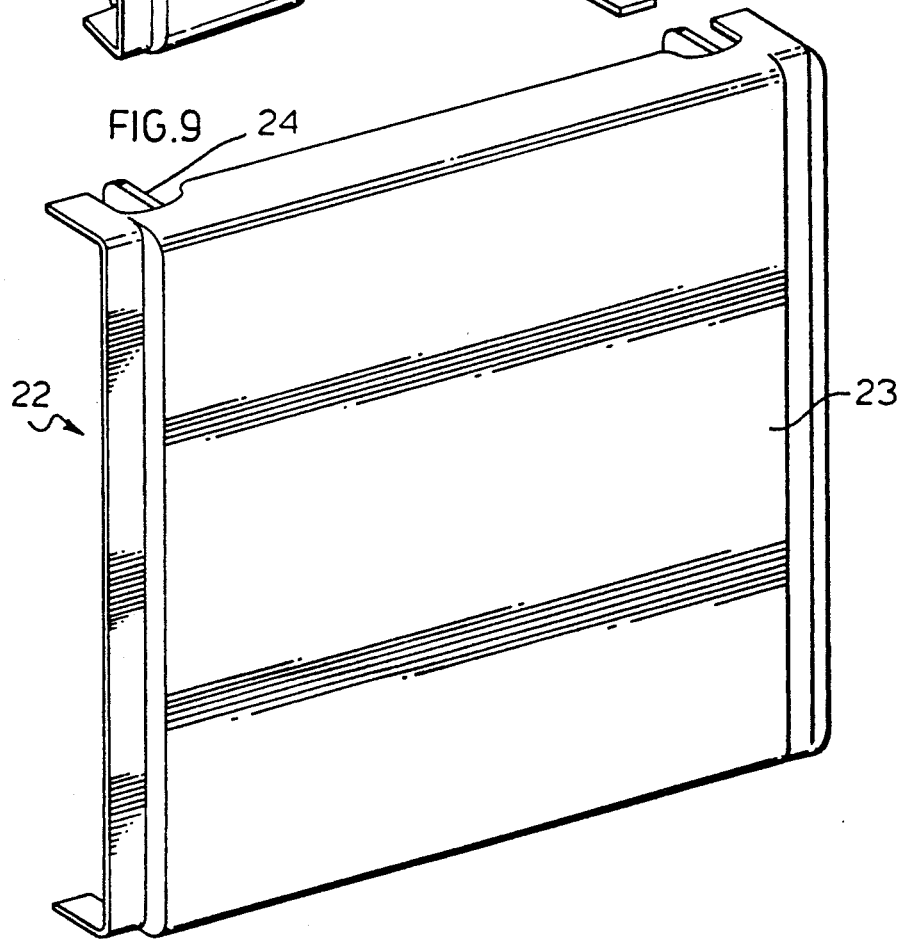
Figure 13:
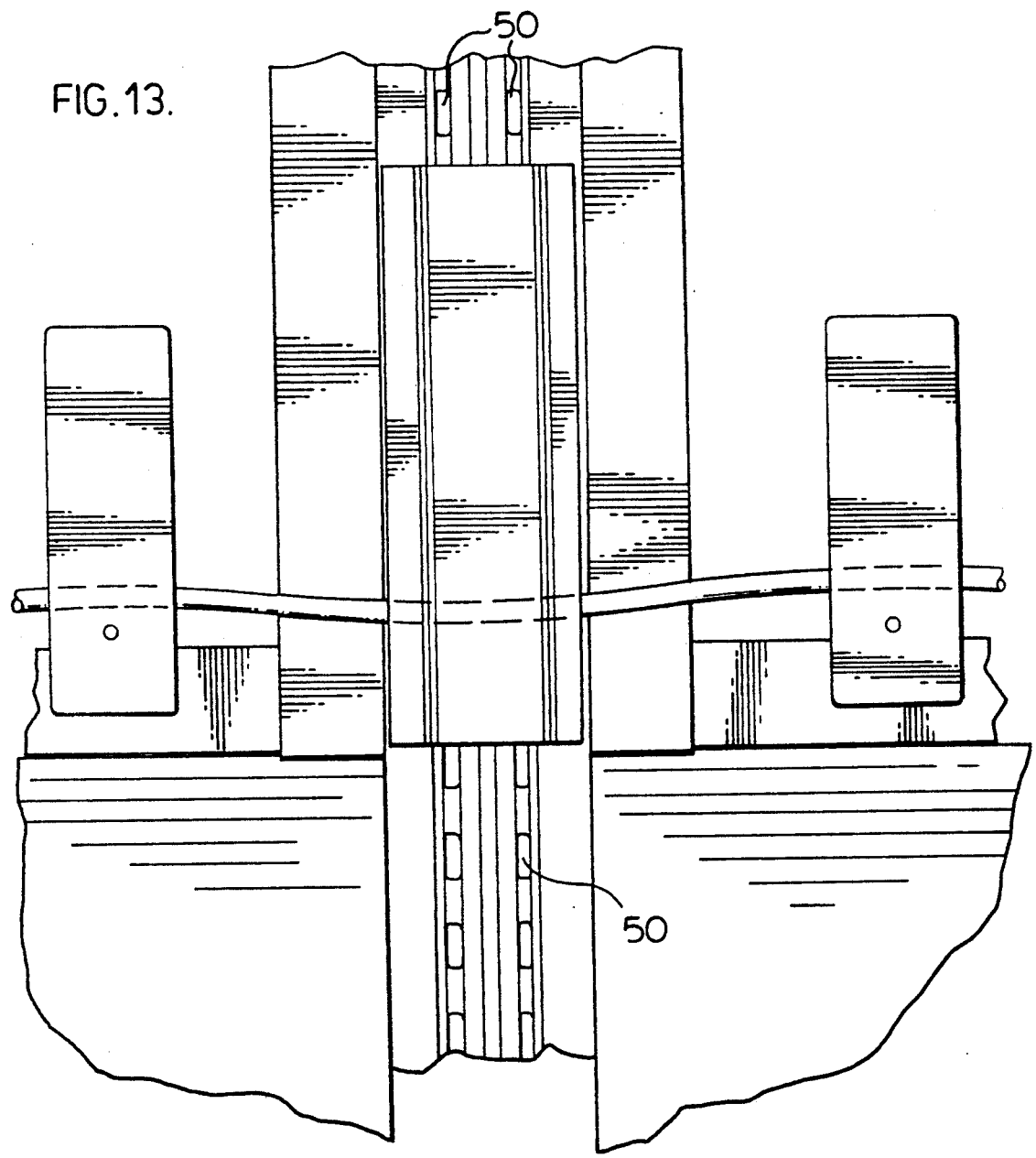
FIG. 13 is a partial side view of two panels with the covers removed and a cover member between the adjacent panels.

Other junction members are shown in FIGS. 7 through 10. FIG. 10 is a perspective view of the 90° exterior junction member, as shown in FIG. 6. FIGS. 7 and 8 show front and back views of junctions members between abutting panels as used in FIG. 3. The junction member of FIG. 9 would be used at a "T" junction of panels, generally shown as 22a in FIG. 2. In each case, the junction members stands off of the vertical members 8 of the adjacent panels and provides a passageway behind the face of the junction member and in front of the vertical members through which cables can pass. The junction members 22 in FIG. 13 are secured to the vertical members 8 by means of various ports 50 provided in the vertical members which receive the hooks 24 and 25. These ports 50 are for receiving and securing other accessories of the system as well. As can be appreciated, the customized panels 30 of FIG. 3, used to define the horizontal band of customized covers, would be open at the end panel of the horizontal band and may look unfinished. For this reason, a plug insert, generally shown as 31 in FIG. 3, can be used to plug the end of a customized cover where necessary.

The drawings illustrate the passage of cables across panels, however, the interior of the panels can be used for holding and receiving related equipment, line drivers or the like, and to also allow for access points to allow connection to individual stations. As the cables are accessible to interior of the frame, vertical passage of access lines can be made through the framework. Notches in the top edge and bottom edge can be provided if laying of cable in the vertical direction is desired. This is less likely, as the space between adjacent panels can be used for this purpose.

The junction members allow the vertical members of the frame to remain unchanged, however, it is possible to notch these members to allow passage of the cables thereacross, if desired. This makes retrofit of panels more difficult.

One of the advantages of the present system is that it allows retrofitting of existing office panelling systems merely by replacing certain existing covers with customized covers and junction members while the panel framework remains unchanged. Thus, customized covers and junction members would be used to retrofit an existing system which did not have this capability to have cables laid across the framework protected by covers and junction members. It can be further appreciated that although the location of this horizontal band of customized panels has been shown at the upper edge of the panel, it can occur at any location, but preferably is located above desk height or at or above the very small panels shown in FIG. 1. It is generally less desirable from a cost standpoint to have all panels adapted in this manner, however, this clearly could be done and would provide great flexibility as all panels could receive and accommodate such cables.

The narrow covers 20a are hinged to the panels at the upper edge of the covers. These covers also can be notched to receive cables, however, it is preferred to notch covers above covers 20a.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A modular office panelling system with an arrangement for providing cable routing between adjacent panels comprising; a plurality of interconnected adjacent panels, each of said adjacent panels having a plurality of removable covers, a top frame, bottom frame, opposed side frames and a cable routing arrangement; some of said removable covers of said panels aligning to form a horizontal segment of aligned covers extending horizontally across a plurality of panels; each of said aligned covers having an interior side and end portions with each end portion having a recess on the interior surface of said aligned covers, junction members releasably secured to and extending between said side frames of adjacent panels, each junction member overlapping with said side frames of adjacent panels and having an exterior surface outwardly spaced from said side frames to define a cable passage recess between said side frames and said exterior surface, said cable passage recess joining with and being open to said recesses on the interior surface of said aligned covers of adjacent panels to collectively define a cable passageway between adjacent panels starting within the recesses of said covers and extending between adjacent panels across said side frames covered and protected by said junction member between adjacent side frames.

2. A modular office panelling system as claimed in claim 1 wherein said horizontal segment is provided at desk height.

3. A modular office panelling system as claimed in claim 2 wherein said aligned covers forming said horizontal segment are each hinged to said frame along an upper edge thereof such that said aligned covers may be pivotted about said hinge to expose said side frames for routing of cables between adjacent panels.

4. A modular office panelling system as claimed in claim 3 wherein each panel includes a horizontal structural member extending between said opposed side frames, said horizontal structural member being located behind said hinged cover and includes clip means secured on said horizontal structural member, said clip means retaining cables interior to the panel between said side frames.

5. A modular office panelling system as claimed in claim 4 wherein said aligned covers extend essentially between and across said opposed side frames.

* * * * *